United States Patent [19]
McClure et al.

[11] Patent Number: 5,665,188
[45] Date of Patent: Sep. 9, 1997

[54] METHOD OF PRODUCING GAME BALLS USING HEAT ACTIVATED GLUE

[75] Inventors: Harry F. McClure; Dan S. Pitsenberger, both of Tullahoma; James C. Larry, Manchester, all of Tenn.

[73] Assignee: Worth, Inc., Tullahoma, Tenn.

[21] Appl. No.: 440,208

[22] Filed: May 12, 1995

[51] Int. Cl.$^6$ .................. B32B 7/08; B32B 31/02; B32B 31/26; B05D 1/40
[52] U.S. Cl. .................. 156/93; 118/244; 118/258; 156/153; 156/212; 156/307.5; 156/307.7; 156/308.2; 156/331.4; 156/331.7; 427/378; 427/428
[58] Field of Search ............... 156/93, 153, 145, 156/213, 228, 308.2, 320, 324.4, 578, 307.5, 307.7, 331.4, 331.7; 427/177, 428, 378; 118/200, 207, 244, 258, 263; 273/60 R, 60 A, 60 B, 58 A

[56] References Cited

U.S. PATENT DOCUMENTS

| | | | |
|---|---|---|---|
| 455,493 | 7/1891 | Hille et al. | 118/244 |
| 841,029 | 1/1907 | Marcus | 156/578 |
| 1,531,162 | 3/1925 | Valero | 273/60 A |
| 2,684,106 | 7/1954 | Fegan | 156/228 |
| 4,149,720 | 4/1979 | Heald, Jr. | 273/60 R |
| 4,529,772 | 7/1985 | Druschke et al. | 156/327 |
| 4,853,056 | 8/1989 | Hoffman | 156/228 |
| 4,880,233 | 11/1989 | Song | 273/60 R |
| 5,338,569 | 8/1994 | Hatch | 427/378 |

FOREIGN PATENT DOCUMENTS

60-194968  10/1985  Japan .

*Primary Examiner*—Michael W. Ball
*Assistant Examiner*—Richard Crispino
*Attorney, Agent, or Firm*—Waddey & Patterson; I. C. Waddey, Jr.

[57] ABSTRACT

An improved method for the manufacture of baseballs including the steps of coating the core of the ball with a heat activated water based latex based glue, drying the glue, positioning a multi-part cover about the surface of the ball, stitching together the adjoining edges of the multi-part cover, heating the ball to activate the heat activated glue in order to securely glue the cover to the core after the stitching of the cover to join the seams of the cover about the core.

19 Claims, 4 Drawing Sheets

METHOD OF PRODUCING GAME BALLS USING HEAT ACTIVATED GLUE

BACKGROUND OF THE INVENTION

The present invention relates generally to a method of manufacturing baseballs and softballs and more particularly to a method of manufacturing balls employing a heat activated glue to bond the cover of the ball to the core. In this application, the process will be described in conjunction with the manufacture of baseballs, but it is understood that the process is equally applicable to the process of manufacturing softballs and other game balls which involves the application of a cover to a core with a glue to bond the cover to the core and the stitching of seams connecting multi-piece covers in a pre-determined pattern.

The use of adhesives in the manufacture of sporting goods is well established. For example, in the sports footwear industry, a long standing manufacturing process involves the utilization of various adhesives to improve the durability of the sewn product. In the fabrication of such footwear, the parts that are adhered will receive uniform amounts of adhesive and are thereafter pressed together to form the bond. The newly bonded components begin to cure, but the individual parts that receive the adhesive are not handled again in such a manner as to impair the integrity of the adhesive bond. By comparison, the steps employed in manufacturing baseballs are more cumbersome.

Using current methodology, a baseball receives an application of adhesive to both the core and the cover material. This step is similar to the comparable step in the manufacture of footwear. The deviation from the footwear process occurs in the baseball manufacturing process as a result of the operator having to continually renegotiate the bonding of the cover and the core as he/she manipulates them during the sewing step. Thus, strong adhesives are not expedient since they prohibit down stream processing in the manufacture of the baseball. Specifically, if the cover is adhered to the core by a strong adhesive, the cover cannot be manipulated by the person stitching the seams to join the pieces of the cover. These considerations have resulted in mild adhesives becoming established as the standard glue from a manufacturing perspective. These mild adhesives allow the sewing step to be performed at a reasonable speed because the operator can manipulate the cover during the sewing process. On the other hand, manipulation of the cover during the sewing process will affect the integrity of the adhesive bond, sacrificing baseball quality and performance.

Attempts to overcome these problems in the industry have included a process commonly used in the industry today involving the application of a dry film adhesive on the core of the baseball; however, this process requires an application of adhesive to the cover and the cover adhesive activates the core adhesive which begins to cure once the cover is applied to the ball and during the course of the operator performing the sewing process. While this process is an improvement over earlier processes which simply use a mild adhesive, the process still has drawbacks: the bonding integrity is impaired during the sewing step and there is the necessity of applying a coat of adhesive to the cover which is time consuming and expensive to perform.

What is needed then is a method of manufacturing baseballs which is more efficient, which produces a better quality product and which does not increase the expense as compared to presently available manufacturing methods.

Heat activated glues have been available in the marketplace for several years. However, until recently heat activated glues were solvent based, and therefore very flammable. For that reason, the use of heat activated glues in the manufacture of baseballs was a hazardous undertaking, particularly since a substantial volume of the manufacture of baseballs today occurs in third world countries where this hazard is greatly exacerbated. Further, the employment of a heat activated gluing process has been dismissed as being innately, and prohibitly, expensive. Heat activated adhesives are four times more costly than those commonly used in the industry today.

Applicants, by innovating a highly efficient method of application, and through the use of the most ubiquitous water based latex based adhesives, have been able to control costs so that the actual cost of manufacturing baseballs using Applicants' new process is comparable to the cost of the less desirable processes heretofore employed in the industry.

It is therefore an object of the present invention to provide an improved method of manufacturing baseballs.

It is a further object of the present invention to provide an improved method of manufacturing baseballs which facilitates the use of heat activated glue to bond the cover to the core of a baseball.

It is still a further object of the present invention to provide an improved method of manufacturing baseballs using a heat activated gluing process with improved safety.

It is yet a further object of the present invention to provide an improved method of manufacturing baseballs through which a higher quality and more efficient baseball can be produced using a heat activated gluing process at an expense substantially equal to or less than the expense associated with prior art methods.

It is still a further object of the present invention to provide a method of manufacturing baseballs which glues the cover to the core using a heat activated gluing process which eliminates the steps of having to both the core and the coat.

A process which meets these objectives is presently unavailable in the industry as established by the state of the prior art.

SUMMARY OF THE INVENTION

An improved method for the manufacture of baseballs including the steps of coating the core of the ball with a heat activated water based latex based glue, drying the glue, positioning a multi-part cover about the surface of the ball, stitching together the adjoining edges of the multi-part cover, heating the ball to activate the heat activated glue in order to securely glue the cover to the core after the stitching of the cover to join the seams of the cover about the core.

DESCRIPTION OF THE PREFERRED EMBODIMENT

The preferred embodiment of Applicant's invention will be best understood when considered in connection with the drawings, including FIGS. 1–7, wherein like numerals refer to like parts.

Figure 1:
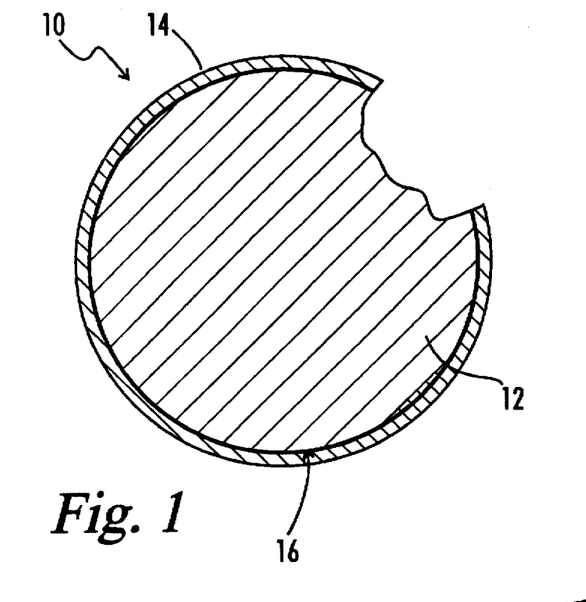
FIG. 1 shows a cross sectional view of a game ball with a cut out portion.

FIG. 1 illustrates a cross sectional view of a game ball 10. The game ball of this invention can be a baseball, a softball, or other game ball employing a solid, molded core which is covered by a leather or synthetic cover, the cover being formed in sections and the sections stitched together to create the game ball. In this application, the game ball 10 will be referred to generally as a baseball, it being understood that the reference to a baseball is intended to be a generic reference to any game ball having the characteristics just described.

Figure 2:
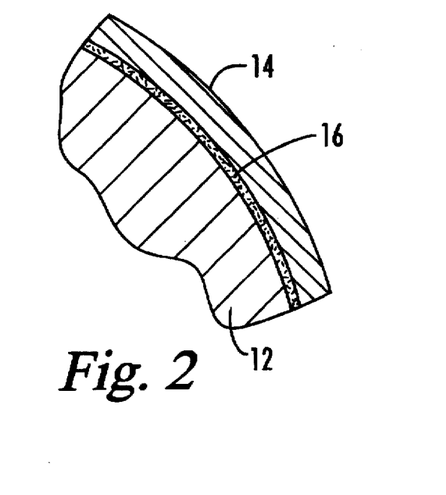
FIG. 2 shows a magnified view of the cut out portion of FIG. 1.

As can be seen from FIG. 1, the ball 10 is constructed of a molded core 12, the core can be molded from a variety of products, depending upon the type of ball being manufactured, including rubber, thermoplastic, thermoset, or polyurethane. A cover 14 surrounds the core 12 and is adhered to the core 12 by glue 16. FIG. 2 illustrates in magnified detail the thin coat of glue 16 between the core 12 and cover 14.

Figure 3:
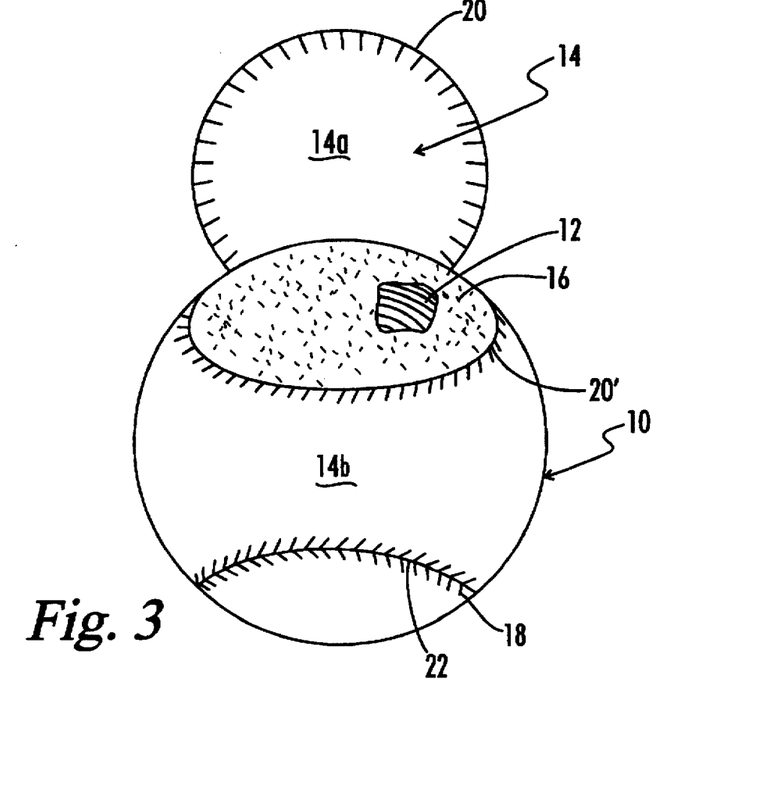
FIG. 3 is a perspective view of a game ball prior to completing the stitching of the threads.

Referring now to FIG. 3, the game ball 10 is illustrated with the cover 14 shown in sections 14a and 14b. The sections 14a and 14b are generally hour glass in shape and when placed at 90° angle to each other, interlocked in a manner that permits them to be joined by stitching 18 about their edges 20, 20'. The stiching 18 forms a seam 22 which is designed to bind the cover 14 tightly about the core 12.

In Applicant's process, the core 12 is coated with a heat activated glue 16 prior to application of the cover 14. The heat activated glue 16 is, in the preferred method, an aliphatic polyester waterborne urethane with approximately 38% solids, having a pH level of eight (8) and a viscosity of 85 cP. The glue currently used by Applicants is manufactured by H. B. Fuller. Company, 1200 Wolters Blvd., Vadnais Heights, Mich. 55110 and is identified as Glue Stock #NP-4060.

The glue is applied in liquid form to the core 12 by a series of dipping rollers and transfer rollers. The glue 16 is then dried by passing the cores through a forced air plenum so that a thin coat of dry, heat activated glue exists on the surface of the core 16 prior to proceeding with the next step of manufacture of the game ball.

Next, the cover 14 is attached to the core by positioning sections 14a and 14b about the core, stapling the sections in place to hold them while the edges 20, 20' are stitched (generally by hand) to form a seam and hold the cover 14 tightly about the core 12. During the stitching process, the operator is free to manipulate the cover sections 14a and 14b and since the gluing of the cover 14 to the core 12 has not yet occurred, the manipulations of the sections 14a and 14b will not impair the integrity of the bond created when the glue is activated. In the prior art processes, where the adhesives are activated when the cover sections 14a and 14b are glued placed about the core prior to the stitching step, the stitching step will tend to cleave the bond between the cover and the core. This disruption of the bond created by the glue does not occur in Applicants' process because the glue is not activated until after the stitching is completed.

The next step in Applicant's process is to heat the game ball to induce the heat activated glue to bond the cover to the core. Heating the game ball is preferably accomplished by passing the ball through a heating chamber which is operated at a relatively high temperature and exposing the game ball to the heat for a relatively short period of time. By employing the heat activated glue, and initiating the gluing process after the stitching has been completed, the possibility of the stitching step impairing the integrity of the bond of the cover to the core is eliminated.

By maintaining the integrity of the bond of the cover to the core during the gluing process of Applicant's invention, the performance of the game ball is significantly improved, the ball having a higher coefficient of restitution (COR), and eliminating in great measure, the possibility of the cover moving in relationship to the core upon impact by a bat with the ball. Eliminating movement between the cover and the core upon impact eliminates the loss of energy that would otherwise result from that movement. Preserving the energy transferred from the bat to the ball results in a ball made by Applicants' process travelling further upon the same force of impact by a bat than would a ball constructed by methods previously known in the industry.

Figures 4, 5:
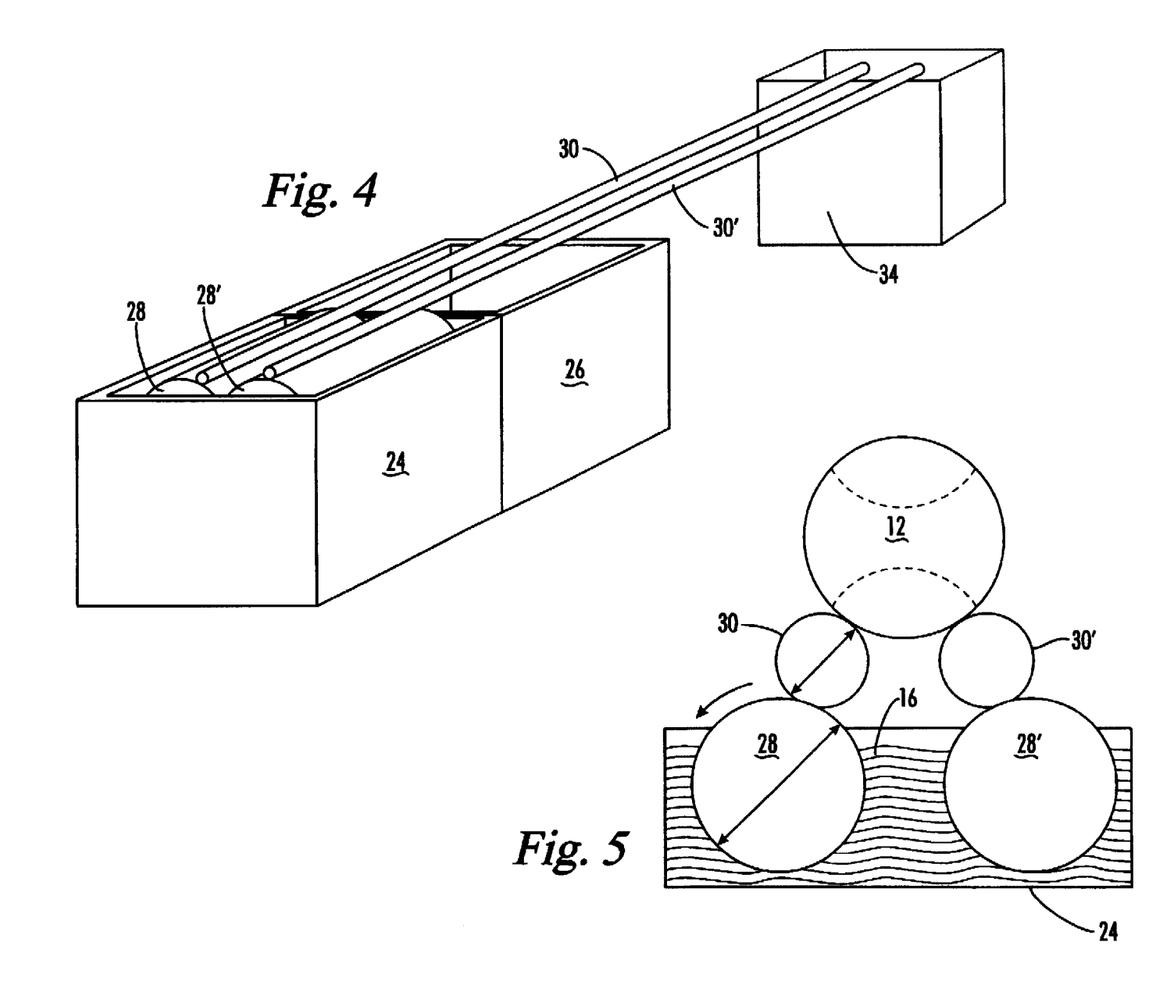
FIG. 4 shows a perspective view of an assembly for applying the heat activated glue to ball cores.
FIG. 5 shows a cross sectional view of the assembly illustrated in FIG. 4 taken along a line passing through the vat.

Turning now to FIGS. 4, 5, 6 and 7, there is illustrated a structure and preferred method of implementing the steps associated with Applicant's invention. Specifically, FIG. 4 shows in perspective view a system for applying a heat activated glue to the cores. In this system, there is a vat 24 which is filled with the heat activated glue in a liquid state. Attached to one end of the vat 24 is a drain basin 26 and remote from the drain basin 26 is the hopper 34. In addition to the heat activated glue in the vat 24, there are a pair of dipping rollers 28, 28'.

As can be best seen from FIG. 5, the two dipping rollers 28, 28', which preferably are approximately 3" in diameter, travel in a counter-clockwise direction when viewed from the vat and looking in the direction of the hopper. Mounted for surface engagement with the two dipping rollers 28, 28' are two transfer rollers 30, 30'. As can be seen from both FIGS. 5 and 6, the transfer rollers 30, 30' are elongated and extend from the vat 24 to the hopper 34. The placement of the dipping rollers 28, 28' is such that they are located within the vat 24 but a portion of their perimeter protrudes above the upper most portion of the vat 24. Thus, the transfer rollers 30, 30' are positioned above the vat 24 and the drain basin 26 so that they can pass over both of those structures.

The transfer rollers 30, 30' are mounted for rotational engagement with the rotating dipping rollers 28, 28' and are driven by any convenient motor and drive train mechanism. The transfer roller 30, 30' are rotating in a clockwise direction and because they are smaller in diameter than the dipping rollers 28, 28', the transfer rollers will rotate at a substantially greater speed than the speed of rotation of the dipping rollers.

As the dipping rollers rotate within the bath of heat activated glue contained within the basin 24, a film of glue will remain on the outer perimeter of each roller as the perimeter of the roller passes out of the bath of glue. The surfaces of the transfer rollers receive the heat activated glue from the perimeter of the dipping rollers and the heat activated glue will then be transferred to cores 12 which are being fed onto the transfer rollers 30, 30'. After the cores 12 are fed onto the transfer rollers 30, 30' from directly above the vat 24, the action of the transfer rollers will cause them to rotate in a variety of random movements so that the entire surface of the core 12 will be coated with glue. Excess glue from the cores and the transfer rollers will drop into the drain basin 26 and be returned to the vat 24.

Figure 6:
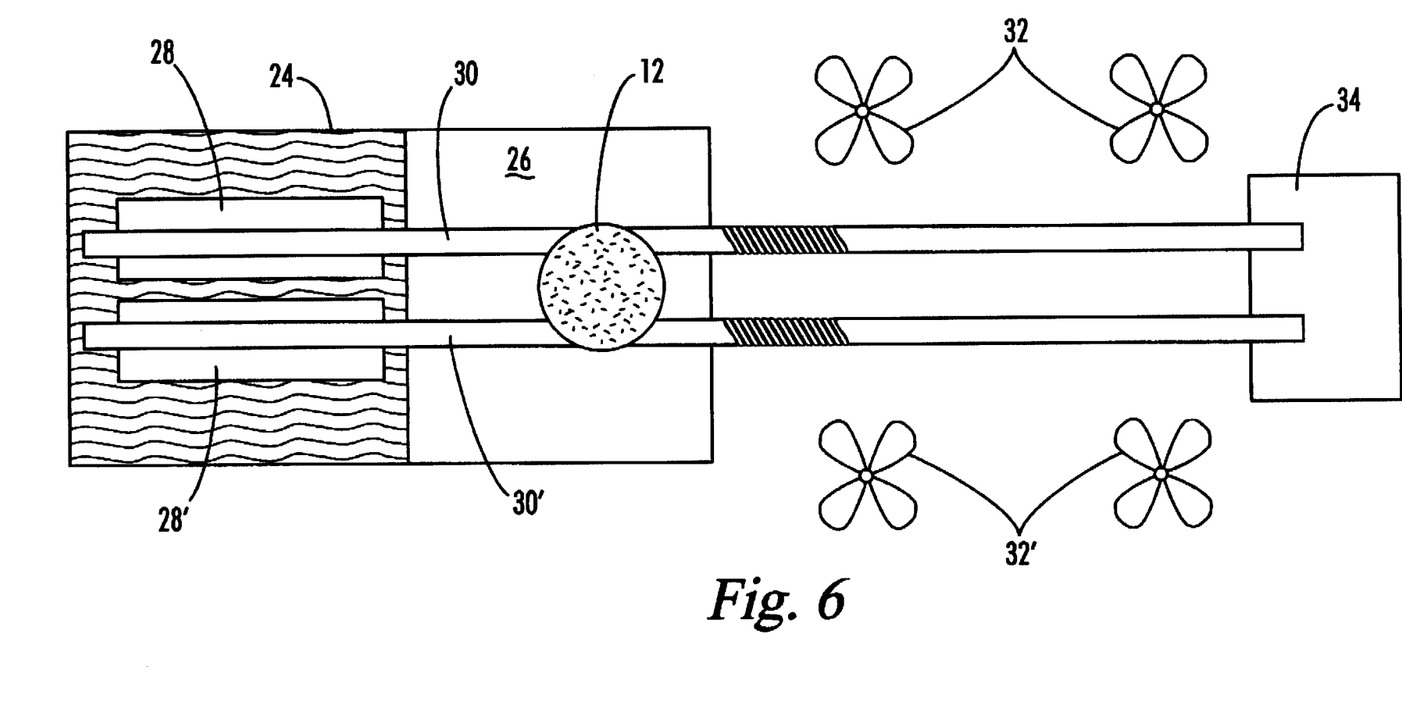
FIG. 6 shows a top view of the assembly of FIG. 4.
Figure 7:
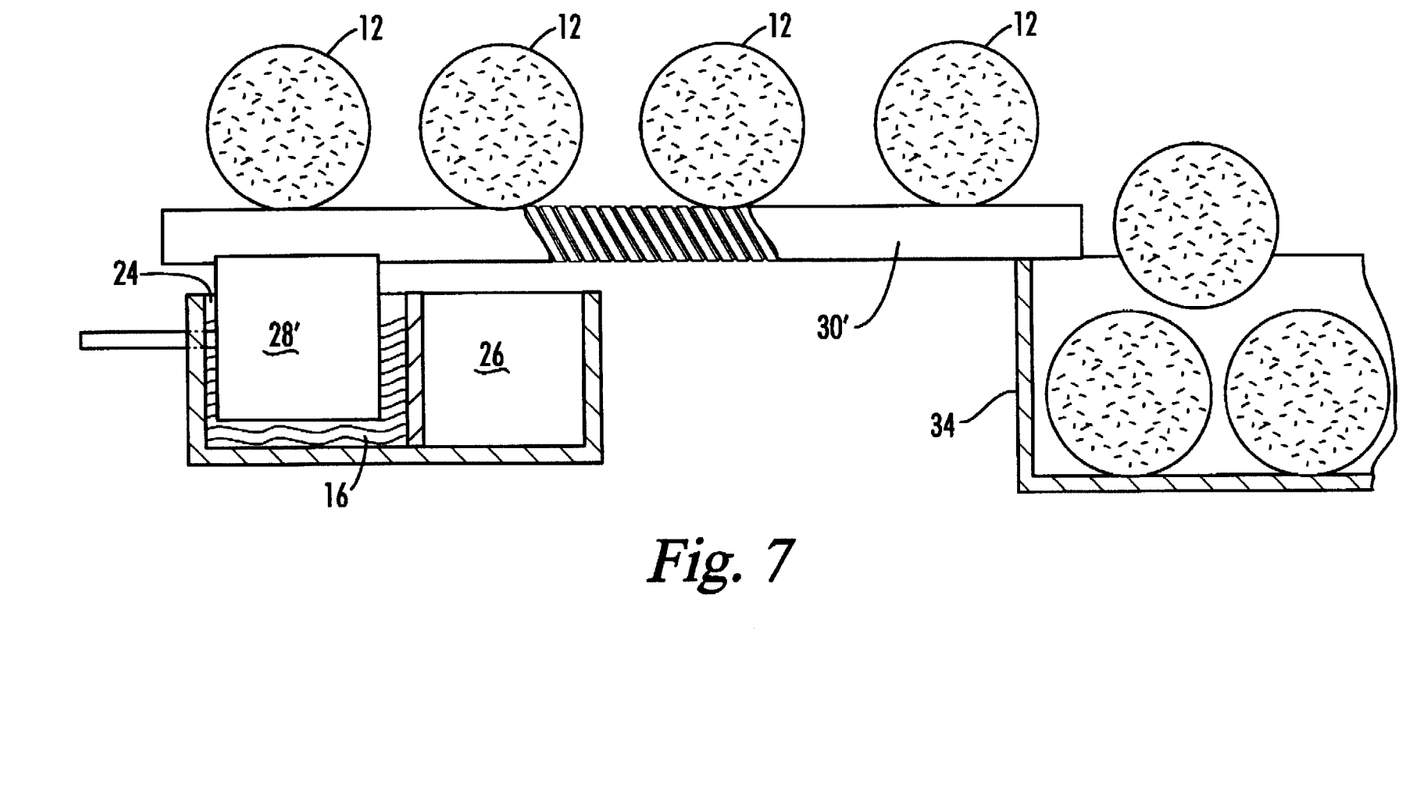
FIG. 7 is a side view of the assembly of FIG. 4.

The surface of the transfer rollers are scored with a helitical groove which provides the friction necessary to move the cores fed onto the transfer rollers forward toward the hopper. The cores move from a position directly above the vat 24, over the drain basin 26, through a drying chamber which is positioned between the drain basin 26 and hopper 34 and, with the glue that has been applied to the surface of the cores now dried but ready for activation, the cores are dumped into the hopper. FIGS. 6 and 7 schematic illustrations top and side views of the structure just described. Of course, other systems can be developed for applying the heat activated glue to the cores and drying that glue so that a thin film of dried glue will remain on the core during the stitching process.

In summary, the Applicant's process is particularly adaptable to game balls manufactured using molded (non-wound) cores which have a cover to be attached to them. First, the non-wound cores are molded. Second, some of the cores, particularly polyurethane cores, have their entire surface sanded and are cleaned of dust. Third, the adhesive is applied to the core. In the preferred embodiment of Applicant's invention, this application of the adhesive is accomplished through the use of an adhesive bath consisting of a 3'×1½' teflon coated vat. A drain area is juxtaposed to the vat in the forward direction and has the same dimensions as the vat. The drain basin is also teflon coated and has a bottom which is angled and positioned higher than the level of adhesive in the vat so that the adhesive collected in the drain basin will drain toward the vat and empty into it. Next, the adhesive on the cores is dried by passing the cores along a forced air plenum and the cores are collected in a hopper after the drying process.

A unique combination of rollers is contemplated for the application of the adhesive in this particular structure. Three inch diameter dipping rollers sit within the bath of adhesive contained in the vat. They rotate slowly in a counter-clockwise direction. Their function is to draw a minimal, even amount of adhesive from the vat. Riding above these rollers are 1" outside diameter transfer rollers that run a length of up to 12' and rotate relatively rapidly in the clockwise direction. That portion of the transfer rollers lying above the bath section are dressed with sponge sleeves for improved absorbency. The result is a uniform and economical application of adhesive in each core.

The operator next stitches the cover sections together about the core, and the sewn ball is routed through a cold roller to press the seams to a uniform height. The sewn ball is then routed through a ball washer that generally cleans the surface from light dust and dirt resulting from handling. Finally, the sewn ball is routed over a conveyor through a confection oven where the heat activation of the glue takes place. The conveyers are designed to provide rotation to the balls as the ball travels through the oven. The conveyer runs over cross bars that are slightly raised within the oven. The cleats on the conveyer push the balls along in forced rotation at the slight ridges where the cross bars are located.

Under ideal circumstances, balls with synthetic covers have a curing time of approximately 15 minutes at 320° F., but Applicants have found a range of temperatures from 260°-320° F. for a period of 4-25 minutes to be acceptable. Balls with leather covers have an ideal curing time of approximately 8 minutes at 400° F., but a range of temperatures from 260°-550° F. for a period of 2-20 minutes is acceptable.

EMPIRICAL EVALUATION OF SOFTBALLS MANUFACTURED USING APPLICANTS' HEAT ACTIVATED GLUE PROCESS

Summary of Field Tests:

Field tests were conducted on both leather and synthetic softballs using players having two different levels of skill over a period of two weeks. In each case, the performance enhancements of balls manufactured using the heat activated glue (HAG) process were significant in comparison with softballs manufactured using normal production techniques. The cumulative results of the field test is as follows:

In both field test of balls having leather covers and synthetic covers, the balls manufactured using the heat activated glue process (these balls being hereinafter referred to as "HAG" balls) had greater hit distance than the regular production softballs. The hit distances were also greater once the balls were adjusted for the differences in the coefficient of restitution ("COR"), indicating that there was less energy lost upon impact.

Due to the uniform bonding that occurs between the cover and the core, the COR of the HAG balls is greater than that of traditional balls. The following chart represents the differences between the COR values:

| Cover Type | Player | Increase Over Stock Balls | COR Adjusted |
|---|---|---|---|
| Leather | A-Level | 4% | 2% |
|  | D-Level | 6% | 4% |
| Synthetic | A-Level | 4% | 4% |
|  | D-Level | 6% | 1% |

The difference of COR values is on the order of 2-2.5% higher for the HAG balls. The information in this chart was used to determine the COR adjusted performance enhancements. The difference in COR is attributed to the reduction of cover movement upon impact with the bat.

Field Test Data of HAG Softballs having Synthetic Covers:

Below are the test results of the synthetic cover softballs that were manufactured with the heat activated gluing process. The balls were compared to Worth's (Applicants' assignee) normal production PX2RS balls sewn in Honduras.

The test was conducted on four separate days with two different classes of players, A and D level. The top twenty hits for each day and each player were recorded and analyzed. Also, the cumulative of the top twenty hits were combined and analyzed.

The COR of each softball was measured before and after field testing. The PX1WS balls, with the heat activated gluing process, had on average a 2.4% higher COR than the PX2RS balls from stock. This average is true for both before and after the field test. The results below show a corrected COR column, which accounts for the before and after difference of COR values for the test balls.

| Round | PX1WS (Heat Activated) | PX2RS (Stock) | Significance @ 90% | Percent Increase (Decrease) | COR Corrected |
|---|---|---|---|---|---|
| Hitter: A-Level | | | | | |
| 1 | 292 | 280 | Yes | 4% | 2% |
| 2 | 290 | 274 | Yes | 6% | 4% |

-continued

| Round | PX1WS (Heat Activated) | PX2RS (Stock) | Significance @ 90% | Percent Increase (Decrease) | COR Corrected |
|---|---|---|---|---|---|
| 3 | 273 | 242 | Yes | 8% | 6% |
| 4 | 283 | 267 | Yes | 6% | 4% |
| Cumulative | 284 | 267 | Yes | 6% | 4% |
| Hitter: D-Level | | | | | |
| 1 | 219 | 213 | No | 3% | 0% |
| 2 | 220 | 216 | No | 2% | 0% |
| 3 | 212 | 214 | No | (1%) | (3%) |
| 4 | 208 | 186 | Yes | 12% | 9% |
| Cumulative | 214 | 206 | Yes | 4% | 1% |

The test results indicate the softballs manufactured using the heat activated gluing process performed better than Worth's current production softballs, for both classes of players. The performance enhancement appears to be between 1 and 4%.

Field Test Data of HAG Softballs having Leather Covers:

Test similar to those described above were also conducted using leather covered softballs manufactured using the HAG process. The results of these tests were similar to the results of the synthetic covered ball tests.

| Round | PX1WL (Heat Activated) | PX2RL (Stock) | Significance @ 90% | Percent Increase (Decrease) | COR Corrected |
|---|---|---|---|---|---|
| Hitter: A-Level | | | | | |
| 1 | 325 | 303 | Yes | 7% | 5% |
| 2 | 319 | 313 | Yes | 2% | 0% |
| 3 | 309 | 296 | Yes | 4% | 2% |
| 4 | 294 | 285 | No | 3% | 1% |
| 5 | 314 | 302 | Yes | 4% | 2% |
| Cumulative | 312 | 300 | Yes | 4% | 2% |
| Hitter: D-Level | | | | | |
| 1 | 233 | 207 | Yes | 12% | 10% |
| 2 | 261 | 254 | No | 3% | 1% |
| 3 | 225 | 220 | No | 2% | 0% |
| 4 | 226 | 207 | Yes | 9% | 7% |
| 5 | 240 | 232 | No | 4% | 2% |
| Cumulative | 237 | 224 | Yes | 6% | 4% |

The test results indicate that the softballs manufactured using the heat activated gluing process performed better than Worth's current production softballs, for both classes of players. The performance enhancement appears to be between 2 and 4%.

The following three tables also illustratre the results of additional field testing. Table 1 (and the accompanying chart) shows the results of separation force tests undertaken on various types of balls. Table 2 (and the accompanying chart) shows COR comparisons of various balls both before and after field tests; and Table 3 shows the COR comparison between the core and the finished ball of balls manufactured using the HAG process and balls (and cores) from stock.

TABLE 1

Field Testing & COR Comparison of Heat Activated Glued (HAG) Softballs

| Separation Force Ball | Force (lbs) |
|---|---|
| HAG-Leather | >28.0 |
| HAG-Synthetic | >28.0 |
| Worth-Leather | 3.0 |
| Other-Leather | 1.5 Maximum |
| Other-Synthetic | 0.5 Maximum |

CHART (accompanying TABLE 1):

TABLE 2

Field Testing & COR Comparison of Heat Activated Glued (HAG) Softballs

| BALL | COR Before | COR After Field Test |
|---|---|---|
| PX1WL (HAG) | 0.507 | 0.508 |
| PX2RL (Stock) | 0.500 | 0.498 |
| PX1WS (HAG) | 0.501 | 0.497 |
| PX2RS (Stock) | 0.489 | 0.485 |

CHART (accompanying TABLE 2):

TABLE 3

Field Testing & COR Comparison of Heat Activated Glued (HAG) Softballs

| COR HAG Core | Finished Ball | COR Stock Core | Finished Ball |
|---|---|---|---|
| 519 | 523 | 519 | 514 |
| 516 | 519 | 520 | 510 |
| 517 | 513 | 521 | 504 |
| 517 | 518 | 518 | 504 |
| 522 | 516 | 520 | 506 |
| 520 | 507 | 520 | 506 |
| 521 | 515 | 520 | 502 |
| 519 | 516 | 517 | 506 |

TABLE 3-continued

| Field Testing & COR Comparison of Heat Activated Glued (HAG) Softballs | | | | |
|---|---|---|---|---|
| 521 | 518 | | 518 | 509 |
| 521 | 518 | | 520 | 507 |
| 517 | 514 | | 515 | 506 |
| 519 | 514 | | 515 | 502 |
| 0.519 | 0.516 | Average | 0.519 | 0.506 |

| | HAG | Stock |
|---|---|---|
| Core COR | 0.519 | 0.519 |
| Finished Ball COR | 0.516 | 0.506 |
| COR Loss | 0.003 | 0.012 |

The process of this invention has been described using heat activated glue, but the process would also be effective using glue, the adhesive properties of which are activated by other remote stimulation such as UV rays, microwave radiation or the like.

Although there have been described particular embodiments of the present invention of a new and useful method of producing game balls using heat activated glue, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What we claim is:

1. A method of manufacturing a molded core game ball having a cover including the steps of:
   a. forming a molded core having an exterior surface;
   b. coating the exterior surface of said molded core with a heat activated adhesive;
   c. treating said heat activated adhesive so that it is not tacky thereby allowing a cover placed on said core to be shifted freely on said core;
   d. placing a multi-piece cover about said core, the pieces of said multi-piece cover being shaped to have mating edges when placed about said core;
   e. stitching together the mating edge of said pieces of said cover;
   f. heating the ball at a sufficient temperature and for a sufficient time to activate the heat activated adhesive whereby said heat activated adhesive will bond said cover to said core.

2. The process of claim 1 wherein coating of the exterior surface of the molded core is performed with liquid heat activated adhesive and wherein the step of treating said heat activated adhesive after it is applied to said core and prior to placing the cover about said core is to dry said heat activated adhesive.

3. The method of claim 2 wherein said heat activated adhesive is applied to said core by rollers passing through a vat containing the adhesive in liquid form.

4. The method of claim 2 wherein the drying of said heat activated adhesive is achieved by application of forced air to the core bearing the adhesive.

5. The method of claim 4 wherein the forced air is applied by passing the core through a plenum with fans driving the forced air over the core, the core and propelling the cores along the length of the transfer rollers through a drying stage and into a collection container.

6. The method of claim 1 wherein said heat activated adhesive is water-based.

7. The method of claim 6 wherein said heat activated adhesive has an aliphatic polyester waterborne urethane with substantially 38% solids, having a pH level of substantially eight (8) and a viscosity of substantially 85 cP.

8. The method of claim 1 wherein the cover is formed in two or more mating parts and further including the step of applying the mating parts of the cover to the core while the core has a film of dry, heat activated adhesive on the outer perimeter thereof and stitching the sections of the cover together.

9. The method of claim 1 wherein the cover is a synthetic material and the heating step is performed at a temperature in the range of 260° to 320° F. and for a period of time in the range of 4 to 25 minutes.

10. The method of claim 1 wherein the cover is a leather material and the heating step is performed at a temperature in the range of 260° to 550° F. and for a period of time in the range of 2 to 20 minutes.

11. The method of claim 1 wherein the cover is synthetic and the heating step is performed for a period of substantially 15 minutes at a temperature of substantially 320° F.

12. The method of claim 1 wherein the cover is leather and the heating step is performed for a period of substantially 8 minutes at a temperature of substantially 400° F.

13. The method of claim 1 wherein said core is molded of polyurethane and further including the step of lightly sanding the exterior surface of said core prior to the application of the coat of heat activated adhesive to said exterior surface.

14. A method of manufacturing a game ball including the steps of:
   a. forming a molded core having a spherical outer surface;
   b. forming a cover in two or more sections, the sections designed to mate with interlocking edges to form a cover for the entire spherical outer surface of the core;
   c. applying a heat activated glue to the spherical outer surface of the core and treating said heat activated adhesive so that it is dry to the touch;
   d. placing the sections of the cover about the core to cover the entire outer spherical outer surface of the core;
   e. stitching the interlocking edges of the sections of the cover together; and
   f. heating the game ball as assembled to activate the heat activated glue whereby said cover will be bonded to the outer spherical perimeter of the core.

15. The method of claim 14 wherein said heat activated glue is water-based.

16. The method of claim 14 wherein said heat activated glue is applied in a liquid form and wherein said step of treating said activated glue after it is applied to the core and prior to application of the cover to the core is to dry said glue.

17. The method of claim 16 wherein the sections of the cover are hour glass in shape and interlocked to completely cover the spherical outer perimeter of the core when stitched together.

18. A method of manufacturing a game ball including the steps of:
   a. forming a molded core having an exterior surface and a cover to mate with said exterior surface;
   b. coating one surface of said cover with a heat activated adhesive;
   c. drying said heat activated adhesive until it is not tacky, thereby allowing said cover to freely shift on said core when placed about said core;

d. placing said cover about said core;

e. connecting the edges of said cover together; and f. heating the ball at a sufficient temperature and for a sufficient time to activate the heat activated adhesive whereby said heat activated adhesive will bond said cover to said core.

19. A method of manufacturing a molded core game ball having a cover including the steps of:

a. forming a molded core having an exterior surface;

b. coating the exterior surface of said molded core with liquid heat activated adhesive by rollers passing through a vat containing the adhesive in liquid form and transferring the adhesive from the rollers passing through the vat to transfer rollers which apply the adhesive directly to the core and propel the cores along the length of the transfer rollers through a drying stage and into a collection container;

c. drying said heat activated adhesive after it is applied to said core and prior to placing a cover about said core;

d. placing a cover about said core; and e. heating the ball at a sufficient temperature and for a sufficient time to activate the heat activated adhesive whereby said heat activated adhesive will bond said cover to said core.

* * * * *